US012589968B2

(12) United States Patent
Wada et al.

(10) Patent No.: US 12,589,968 B2
(45) Date of Patent: Mar. 31, 2026

(54) GUIDE MECHANISM AND PAPER SHEET HANDLING APPARATUS

(71) Applicant: FUJITSU FRONTECH LIMITED, Tokyo (JP)

(72) Inventors: Takashi Wada, Inagi (JP); Yuji Tanaka, Inagi (JP); Hiroshi Miyazaki, Inagi (JP); Atsushi Ando, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 57 days.

(21) Appl. No.: 18/675,911

(22) Filed: May 28, 2024

(65) Prior Publication Data

US 2024/0312282 A1 Sep. 19, 2024

Related U.S. Application Data

(63) Continuation of application No. PCT/JP2021/047612, filed on Dec. 22, 2021.

(51) Int. Cl.
*B65H 31/20* (2006.01)
*B65H 31/02* (2006.01)
(Continued)

(52) U.S. Cl.
CPC ............. *B65H 31/20* (2013.01); *B65H 31/02* (2013.01); *B65H 31/36* (2013.01); *B65H 83/02* (2013.01);
(Continued)

(58) Field of Classification Search
CPC ........ B65H 31/02; B65H 31/20; B65H 31/34; B65H 31/36; B65H 83/02; B65H 2301/4212; B65H 2403/421; B65H 2404/725; B65H 2405/1122; B65H 2405/114; B65H 2405/1144; B65H 2511/11; B65H 2555/23; B65H 2701/1912; G07D 11/13; G07D 11/17
See application file for complete search history.

(56) References Cited

U.S. PATENT DOCUMENTS

2008/0061498 A1* 3/2008 Suzuki .................. B65H 29/28 271/264
2015/0368064 A1* 12/2015 Nomura .................. B65H 7/02 271/3.15

FOREIGN PATENT DOCUMENTS

JP 02310250 A 12/1990
JP 2002241029 A 8/2002
(Continued)

OTHER PUBLICATIONS

Search Report issued in corresponding European application No. EP 21 96 8929.6 dated Jan. 21, 2025.
(Continued)

*Primary Examiner* — Prasad V Gokhale
(74) *Attorney, Agent, or Firm* — Greer Burns & Crain Ltd.

(57) ABSTRACT

A guide mechanism including a guide that regulates a position of a paper sheet stacked includes a power transmitter that moves the guide to three or more positions by means of power obtained from a separate mechanism, which is different from the guide mechanism, and a switching drive that switches the power transmitter between a transmission state in which the power of the separate mechanism is transmitted to the guide and a non-transmission state in which the power of the separate mechanism is not transmitted.

3 Claims, 7 Drawing Sheets

(51) Int. Cl.

| | |
|---|---|
| ***B65H 31/36*** | (2006.01) |
| ***B65H 83/02*** | (2006.01) |
| ***G07D 11/13*** | (2019.01) |
| ***G07D 11/17*** | (2019.01) |

(52) U.S. Cl.

CPC ............. *G07D 11/13* (2019.01); *G07D 11/17* (2019.01); *B65H 2301/4212* (2013.01); *B65H 2403/421* (2013.01); *B65H 2404/725* (2013.01); *B65H 2405/1122* (2013.01); *B65H 2405/114* (2013.01); *B65H 2511/11* (2013.01); *B65H 2701/1912* (2013.01)

(56) References Cited

FOREIGN PATENT DOCUMENTS

| | | | | |
|---|---|---|---|---|
| JP | 2006306535 A | | 11/2006 | |
| JP | 2006327714 A | * | 12/2006 | ............. B65H 33/02 |
| JP | 2021067986 A | | 4/2021 | |

OTHER PUBLICATIONS

ISR issued in PCT/JP2021/047612, mailed Mar. 15, 2022.
Written Opinion issued n PCT/JP2021/047612, mailed Mar. 15, 2022.
Office action issued in corresponding Japanese patent application No. 2023-568884, dated Dec. 3, 2024.

* cited by examiner

GUIDE MECHANISM AND PAPER SHEET HANDLING APPARATUS

CROSS-REFERENCE TO RELATED APPLICATION

This application is continuation application of International Application PCT/JP2021/047612 filed on Dec. 22, 2021 and designated the U.S., the entire contents of which are incorporated herein by reference.

BACKGROUND

Technical Field

Embodiments discussed herein are relate to a guide mechanism and a paper sheet handling apparatus.

Related Art

Conventionally, a guide mechanism including a guide that regulates a position of a paper sheet stacked in a bill storage unit of a cash deposit machine, an automated teller machine (ATM), or the like is used.

For example, a bill processing apparatus including a movable guide member that regulates the length of a bill storage space in the longer direction of a bill and moves in the longer direction of the bill is known (See, for example, JP 2021-067986 A).

In addition, a sheet processing apparatus including a pair of alignment members that are provided to be movable in the sheet width direction intersecting with the sheet conveyance direction and align both ends of a sheet is known (See, for example, JP 2006-306535 A).

SUMMARY

A guide mechanism disclosed herein is a guide mechanism including a guide that regulates a position of a paper sheet stacked, and includes a power transmitter that moves the guide to three or more positions by means of power obtained from a separate mechanism, which is different from the guide mechanism, and a switching drive that switches the power transmitter between a transmission state in which the power of the separate mechanism is transmitted to the guide and a non-transmission state in which the power of the separate mechanism is not transmitted.

A paper sheet handling apparatus disclosed herein is a paper sheet handling apparatus including a guide mechanism, and the guide mechanism includes a guide that regulates a position of a paper sheet stacked, a power transmitter that moves the guide to three or more positions by means of power obtained from a separate mechanism, which is different from the guide mechanism, and a switching drive that switches the power transmitter between a transmission state in which the power of the separate mechanism is transmitted to the guide and a non-transmission state in which the power of the separate mechanism is not transmitted.

The object and advantages of the present invention will be realized by the elements set forth in the claims or combinations thereof.

DETAILED DESCRIPTION

For example, in a guide that conveys a paper sheet in the conveyance direction parallel to the shorter direction of the paper sheet and regulates the position of the paper sheet at the back in the conveyance direction, it is desirable to form a storage space for the paper sheet in the shorter direction to be larger than the paper sheet by, for example, about 3 mm to 5 mm.

Therefore, in a case where paper sheets of a plurality of sizes are stacked, the guide is moved in accordance with the size of each paper sheet in order to form an optimum storage space corresponding to each of the plurality of sizes of the paper sheets.

However, for example, in a case where the guide is moved in two stages using a rotary solenoid, the guide can be moved only to the retraction position and one regulation position. In addition, in a case where a motor or the like capable of freely moving the guide is arranged, the cost is high.

Hereinbelow, a guide mechanism and a paper sheet handling apparatus according to an embodiment of the present invention will be described with reference to the drawings using a guide mechanism 1 and a bill processing machine 100 as examples.

Figure 1:
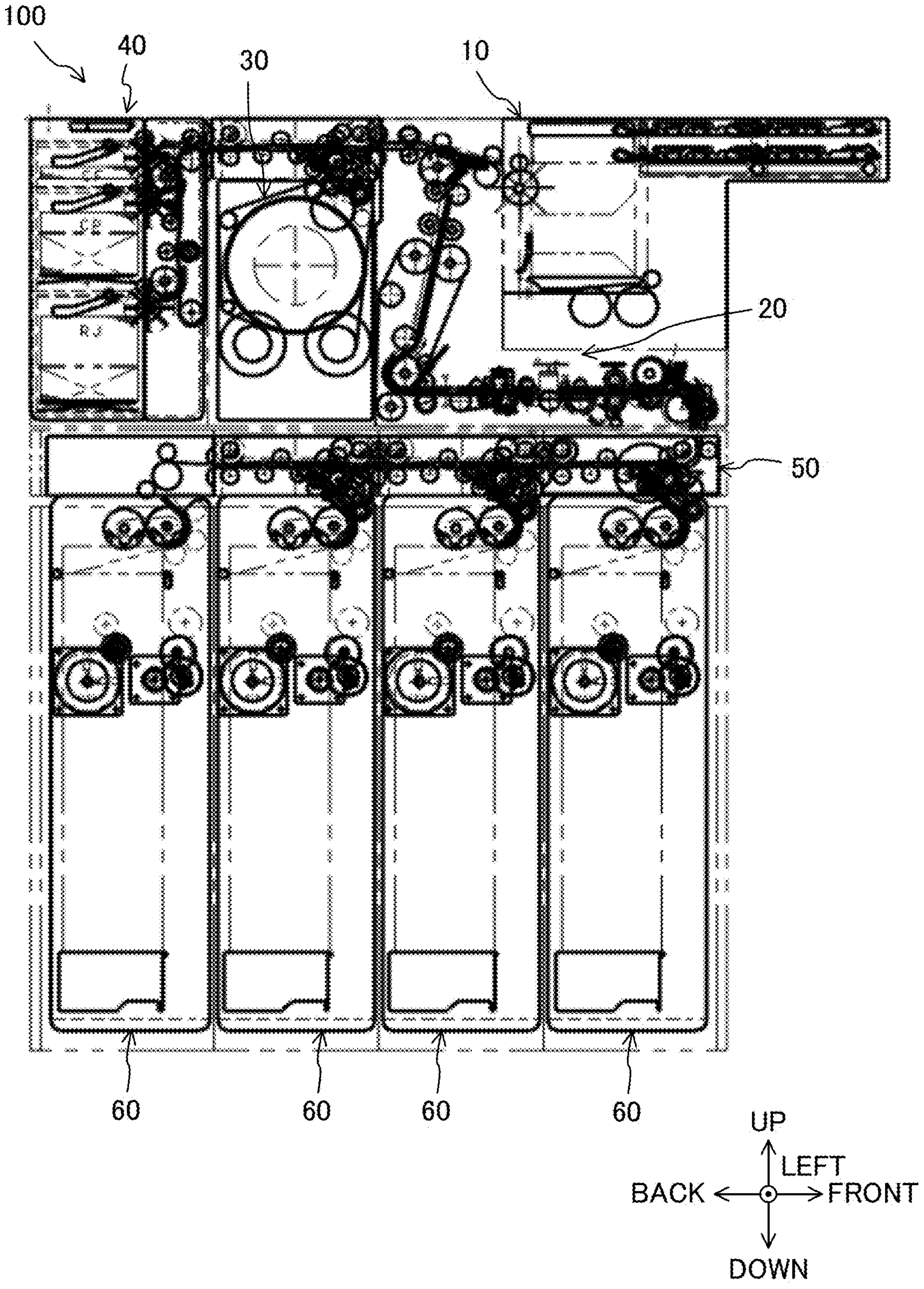
FIG. 1 is a left side view illustrating an internal structure of a bill processing machine according to an embodiment.

FIG. 1 is a left side view illustrating an internal structure of the bill processing machine 100.

Note that the up-down, front-back, and right-left directions illustrated in FIG. 1 and FIGS. 2 to 6 to be described below are illustrative only in a case where a customer side of the bill processing machine 100 is the front direction. For example, the up-down direction is a vertical direction, and the front-back direction and the right-left direction are horizontal directions.

The bill processing machine 100 illustrated in FIG. 1 is, for example, an ATM, a bill recycle unit (BRU), a cash dispenser (CD), or a teller cash recycler (TCR), and includes a bill depositing and dispensing unit 10, an identification unit 20, a temporarily reserving unit 30, a rejection unit 40, an intermediate conveyance unit 50, and a plurality of storage cassettes 60. Note that the bill processing machine 100 is an example of a paper sheet handling apparatus. Since the paper sheet handling apparatus refers to any apparatus that performs some processing such as conveyance on a paper sheet, the paper sheet handling apparatus can be regarded as, for example, only the bill depositing and dispensing unit 10.

Figure 2:
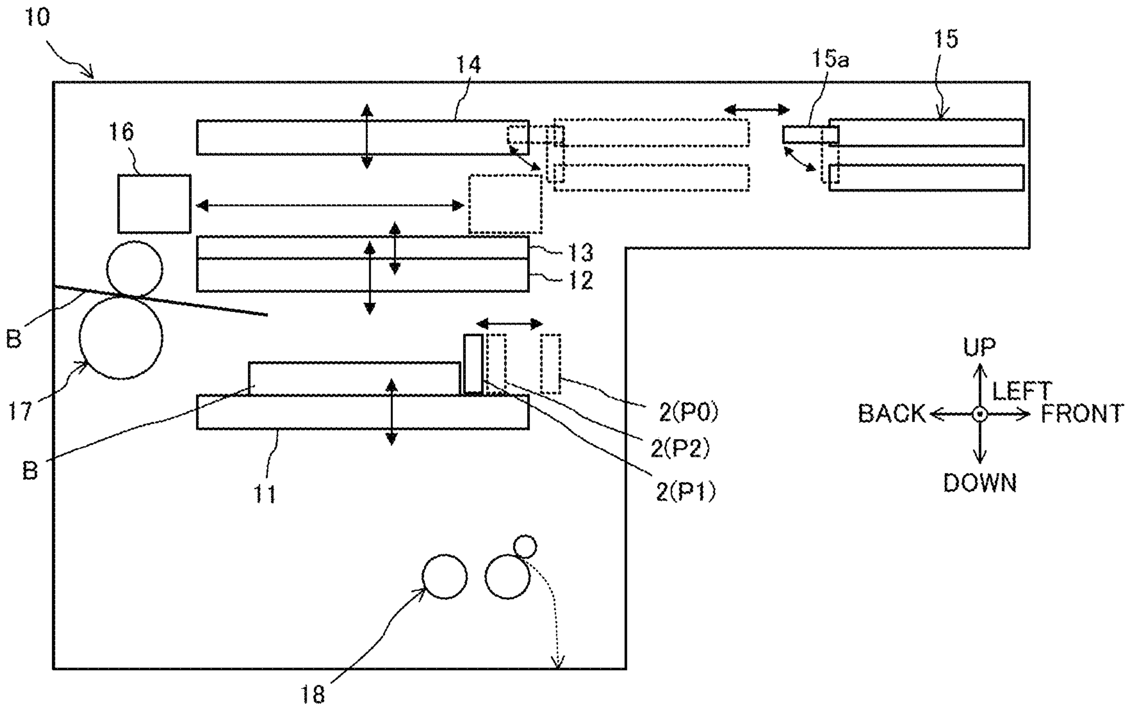
FIG. 2 is a left side view illustrating an internal structure of a bill depositing and dispensing unit according to the embodiment.

As illustrated in FIG. 2, the bill depositing and dispensing unit 10 includes a guide mechanism 1 (only a guide 2 is illustrated in FIG. 2) to be described below, a stage 11, a pusher 12, a pusher plate 13, a roof 14, a shuttle 15, a push-in wall 16, a supply unit 17, a feeding unit 18, and a drive gear 19 (see FIGS. 3 to 6).

The stage 11 is disposed so as to be movable up and down, and as illustrated in FIG. 2, a bill B to be dispensed or a bill B to be deposited is stacked thereon. Note that the bill B is an example of a paper sheet.

The pusher 12 is disposed above the stage 11. The pusher 12 is disposed so as to be movable up and down, and can press the bill B on the stage 11 from above.

The pusher plate 13 is disposed above the pusher 12. The pusher plate 13 is disposed so as to be movable up and down, and receives from the supply unit 17 the bill B to be returned out of the bills B fed from the stage 11 by the feeding unit 18.

The roof 14 is disposed above the pusher plate 13. The roof 14 is disposed so as to be movable up and down.

The shuttle 15 includes, for example, a pair of upper and lower conveyance belts capable of nipping the bill B, and moves in the front-back direction to a front position (see the solid line in FIG. 2) at the time of depositing and dispensing the bill B and a back position (see the dotted line in FIG. 2) at which the bill B is delivered to and from the stage 11. The shuttle 15 is provided at the back end thereof with a stopper 15*a* that prevents the bill B from falling to the backside from the inside of the shuttle 15. The stopper 15*a* rotates to a position where a space between the back ends of the paired upper and lower conveyance belts of the shuttle 15 is opened (see the solid line in FIG. 2) and a position where the space is closed (see the dotted line in FIG. 2).

The push-in wall 16 is disposed to be movable in the front-back direction, and pushes the bill B on the stage 11 to the front side toward the shuttle 15 at the time of dispensing (moves from the solid-line position to the dotted-line position in FIG. 2).

The supply unit 17 includes, for example, a fin roller and a roller. The supply unit 17 supplies the bill B to be dispensed toward the stage 11 or supplies the bill B to be returned toward the pusher plate 13.

The feeding unit 18 includes, for example, a roller, a separator roller, and the like. The feeding unit 18 feeds the deposited bill B toward the identification unit 20 from the stage 11 that has moved further downward than the position illustrated in FIG. 2 (see the dotted arrow in FIG. 2).

Figure 3:
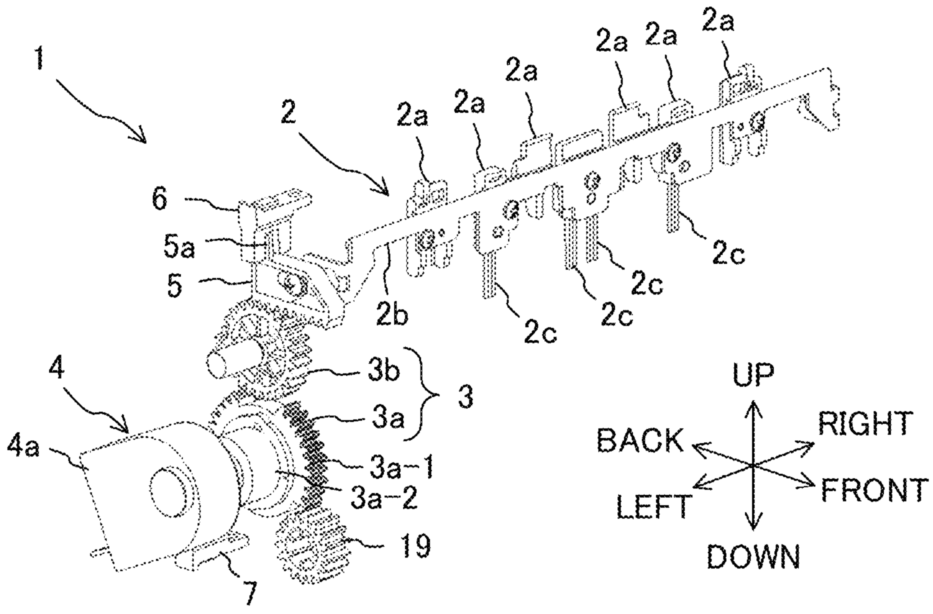
FIG. 3 is a perspective view of a guide mechanism as viewed from the upper left according to the embodiment.

The drive gear 19 illustrated in FIG. 3 is rotated, for example, by power of a drive source of a not-illustrated conveyance mechanism that conveys the bill B in the bill depositing and dispensing unit 10. The conveyance mechanism is an example of a separate mechanism, which is different from the guide mechanism 1, and desirably includes a motor or the like capable of moving a drive target to three or more positions. Note that the separate mechanism described above may be any mechanism capable of applying power to a power transmission mechanism 3, and is not limited to the conveyance mechanism.

Returning to FIG. 1, the identification unit 20 is disposed below the bill depositing and dispensing unit 10, and determines the authenticity, contamination, corner folding, and the like of the bill B conveyed from the bill depositing and dispensing unit 10 (the feeding unit 18).

The temporarily reserving unit 30 temporarily stores the bill B that is conveyed from the bill depositing and dispensing unit 10 to the identification unit 20 and determined to be normal in the identification unit 20.

The rejection unit 40 stores the bill B that is not to be returned, out of the bills B determined to be abnormal in the identification unit 20.

The intermediate conveyance unit 50 conveys the bill B in the front-back direction between the identification unit 20 and the plurality of storage cassettes 60.

The plurality of storage cassettes 60 store, for example, the bills B of different types from each other. The storage cassettes 60 can eject the stored bills B. Therefore, the bills B stored in the storage cassettes 60 are used for dispensing.

FIG. 3 is a perspective view of the guide mechanism 1 as viewed from the upper left.

Figure 4:
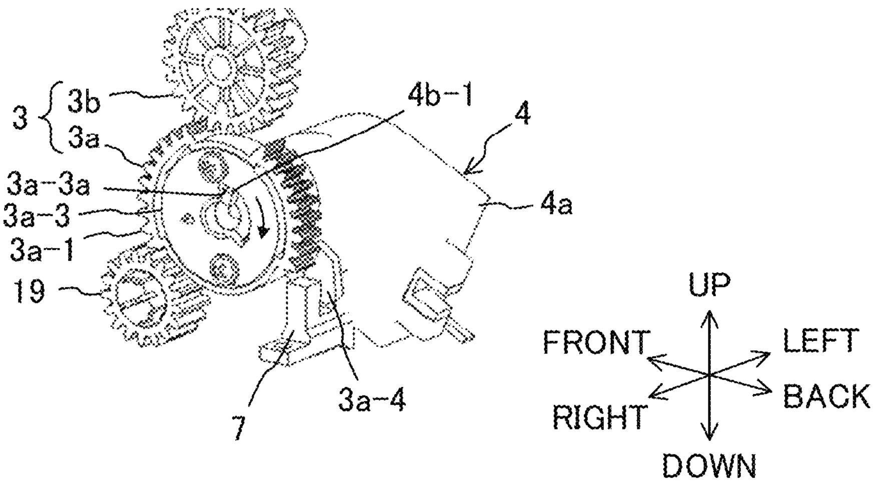
FIG. 4 is a perspective view of a power transmission mechanism and a switching drive unit as viewed from the upper right according to the embodiment.

FIG. 4 is a perspective view of the power transmission mechanism 3 and a switching drive unit 4 as viewed from the upper right.

Figure 5A:
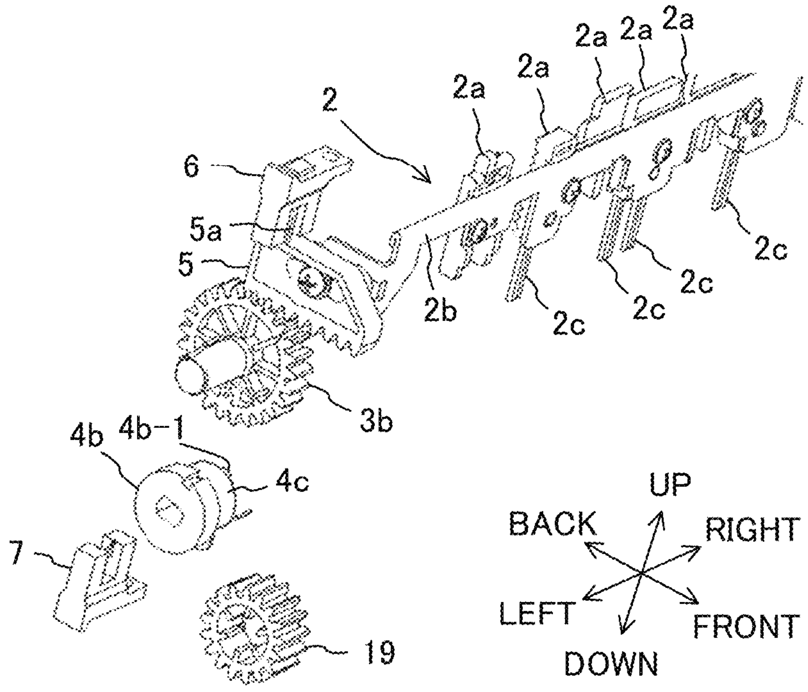
FIG. 5A is a perspective view of the power transmission mechanism (an intermittent gear is omitted) and the switching drive unit (a rotary solenoid is omitted) as viewed from the upper left according to the embodiment.
Figure 5B:
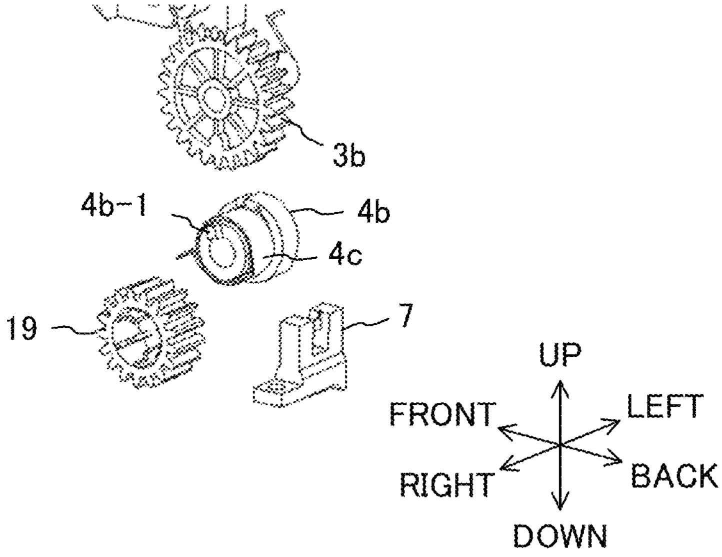
FIG. 5B is a perspective view of the power transmission mechanism and the like (the intermittent gear and the rotary solenoid are omitted) as viewed from the upper right according to the embodiment.
Figure 6:
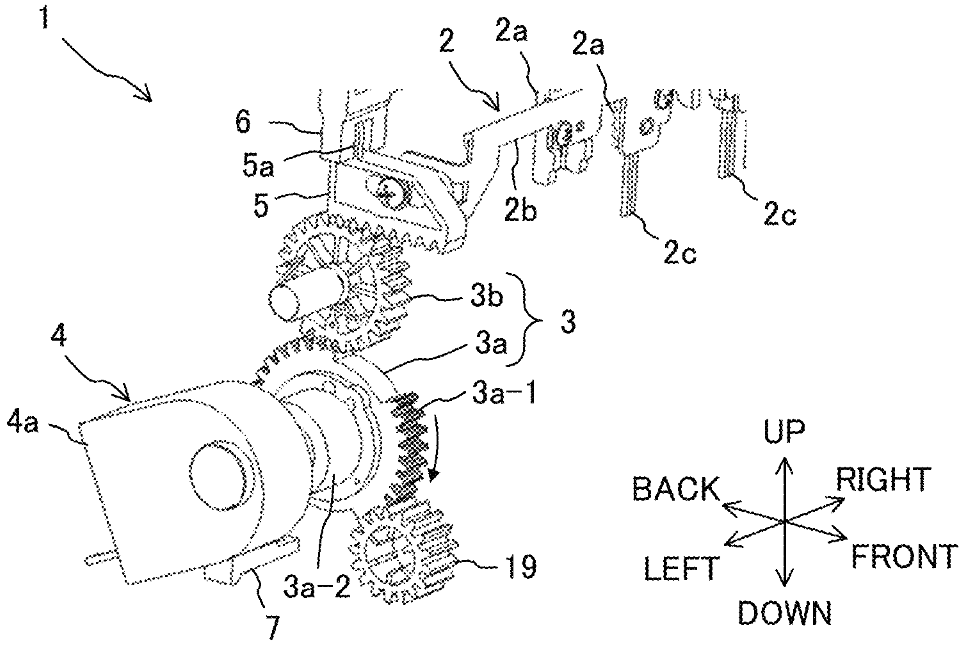
FIG. 6 is a perspective view for describing the operation of the power transmission mechanism according to the embodiment.

FIGS. 5A and 5B are perspective views of the power transmission mechanism 3 (an intermittent gear 3*a* is omitted) and the switching drive unit 4 (a rotary solenoid 4*a* is omitted) as viewed from the upper left and the upper right, respectively.

As illustrated in FIG. 3, the guide mechanism 1 includes a guide 2, the power transmission mechanism 3, the switching drive unit 4, a rack 5, a guide detection sensor 6, and a gear detection sensor 7.

The guide 2 includes a plurality of abutting members 2*a*, a connecting member 2*b*, and a plurality of entry prevention members 2*c*, and regulates the position of the stacked bill B. The guide 2 is movable to three or more positions, and the three or more positions preferably include, for example, two or more regulation positions P1 and P2 that regulate the position of the bill B above the stage 11 and a retraction position P0 that does not interfere with upward and downward movement of the stage 11 as illustrated in FIG. 2. Note that the regulation positions P1 and P2 are preferably different from each other in the position in the conveyance direction (the right-left direction in FIG. 2) that is the shorter direction of the bill B, and the guide 2 is preferably movable according to the size of the bill B so as to form a storage space (stacking space) for the bill B in the shorter direction (the conveyance direction) to be larger than the bill B by, for example, about 3 mm to 5 mm.

Returning to FIG. 3, the plurality of abutting members 2*a* are arranged to be spaced from each other in the longer direction (right-left direction) of the bill B. For example, the bill B supplied to the stage 11 by the supply unit 17 illustrated in FIG. 2 abuts on the abutting members 2*a*.

The connecting member 2*b* extends in the longer direction (right-left direction) orthogonal to the conveyance direction of the bill B and connects the plurality of abutting members 2*a*. The plurality of abutting members 2*a* are fixed to the connecting member 2*b* at the respective central portions thereof in the up-down direction by screwing.

The plurality of entry prevention members 2*c* are fixed to the connecting member 2*b* at the upper ends of the entry prevention members 2*c* so as to hang down from the connecting member 2*b*. The entry prevention member 2*c* prevents the bill B from entering from below the connecting member 2*b*.

The power transmission mechanism (power transmitter) 3 includes the intermittent gear 3*a* and an idle gear 3*b*, and as will be described in detail below, moves the guide 2 to the three or more positions by means of power obtained from the drive gear 19 of the separate mechanism (for example, the conveyance mechanism including a conveyance roller that conveys the bill B), which is different from the guide mechanism 1.

The intermittent gear 3*a* includes a plurality of teeth 3*a*-1, a housing portion 3*a*-2, a back lid 3*a*-3 (see FIG. 4), and a detected piece 3*a*-4 (see FIG. 4), and rotates about the axis in the right-left direction.

In the example of FIG. 3, the intermittent gear 3*a* is provided with two areas in which the teeth 3*a*-1 are provided and two areas in which the teeth 3*a*-1 are not provided. That is, the intermittent gear 3*a* has the teeth 3*a*-1 only in some parts in the rotation direction. One of the two areas provided with the teeth 3*a*-1 meshes with the idle gear 3*b*, and the other meshes with the drive gear 19.

The housing portion 3*a*-2 protrudes leftward from the intermittent gear 3*a*. In addition, the housing portion 3*a*-2 has a cylindrical shape having a shorter diameter than that of the region where the teeth 3*a*-1 are provided, and houses an actuating member 4*b* and a torsion spring 4*c* of the switching drive unit 4 to be described below illustrated in FIGS. 5A and 5B.

As illustrated in FIG. 4, the back lid 3*a*-3 has a circular plate shape and is provided at the right end of the intermittent gear 3*a*. The back lid 3*a*-3 is provided with a stopper hole 3*a*-3*a* extending in a fan shape from the rotation center of the intermittent gear 3*a*. In the stopper hole 3*a*-3*a*, a protrusion 4*b*-1 of the actuating member 4*b* described below is inserted.

The detected piece 3*a*-4 extends so as to protrude in the radial direction of the intermittent gear 3*a* more than the teeth 3*a*-1 do. In addition, the detected piece 3*a*-4 is detected by the gear detection sensor 7 described below at a rotation angle at which the teeth 3*a*-1 of the intermittent gear 3*a* do not mesh with the drive gear 19.

The idle gear 3*b* meshes with the intermittent gear 3*a* having a rotation angle of meshing with the drive gear 19. In addition, as illustrated in FIG. 3, the idle gear 3*b* meshes with the rack 5 described below.

The switching drive unit (switching drive) 4 includes the rotary solenoid 4*a*, and the actuating member 4*b* and the torsion spring 4*c* illustrated in FIGS. 5A and 5B.

The rotary solenoid 4*a* is an example of a switching drive source. The rotary solenoid 4*a* switches the power transmission mechanism 3 to a transmission state (state in which power of the separate mechanism is transmitted to the guide 2) by rotating the intermittent gear 3*a* such that the teeth 3*a*-1 mesh with the drive gear 19, and switches the power transmission mechanism 3 to a non-transmission state (state in which power of the separate mechanism is not transmitted to the guide 2) by rotating the intermittent gear 3*a* such that the teeth 3*a*-1 do not mesh with the drive gear 19. Note that the range in which the intermittent gear 3*a* is rotated by the rotary solenoid 4*a* may be, for example, about 20°.

The actuating member 4*b* illustrated in FIGS. 5A and 5B has a not-illustrated drive shaft, having, for example, a D-shaped cross section, of the rotary solenoid 4*a* inserted from the left end illustrated in FIG. 5A, and rotates integrally with the drive shaft of the rotary solenoid 4*a*.

As illustrated in FIG. 5B, at the right end of the actuating member 4*b* is provided the protrusion 4*b*-1 protruding rightward. As illustrated in FIG. 4, the protrusion 4*b*-1 is inserted in the stopper hole 3*a*-3*a* of the back lid 3*a*-3 described above.

The torsion spring 4*c* is wound around the actuating member 4*b*, one end thereof is hooked and fixed to the actuating member 4*b* as illustrated in FIG. 5B, and the other end thereof is hooked and fixed to the back lid 3*a*-3 of the intermittent gear 3*a* illustrated in FIG. 4. The torsion spring 4*c* biases the actuating member 4*b* so as to rotate the back lid 3*a*-3 (intermittent gear 3*a*) clockwise in FIG. 4. As a result, the end of the stopper hole 3*a*-3*a* of the back lid 3*a*-3 comes into contact with the protrusion 4*b*-1 of the actuating member 4*b*, and the rotation of the intermittent gear 3*a* is regulated. In this state, when the rotary solenoid 4*a* rotates the actuating member 4*b* counterclockwise in FIG. 4 (clockwise in FIG. 6), the intermittent gear 3*a* rotates counterclockwise in FIG. 4 (clockwise in FIG. 6) against the biasing force of the torsion spring 4*c*, and the teeth 3*a*-1 mesh with the idle gear 3*b* and the drive gear 19. As a result, the power of the drive gear 19 is transmitted to the guide 2 via the intermittent gear 3*a*, the idle gear 3*b*, and the rack 5 described below. Thereafter, when the rotary solenoid 4*a* rotates the actuating member 4*b* clockwise in FIG. 4 (counterclockwise in FIG. 6), the intermittent gear 3*a* also rotates clockwise (counterclockwise in FIG. 6) by the biasing force of the torsion spring 4*c*, and the teeth 3*a*-1 do not mesh with the idle gear 3*b* and the drive gear 19. The biasing force of the torsion spring 4*c* is designed to be equal to or less than the holding force of the rotary solenoid 4*a*.

The rack 5 illustrated in FIGS. 3 and 5A meshes with the idle gear 3*b* at the lower end, and moves in the front-back direction with the rotation of the idle gear 3*b*. The rack 5 is fixed to the guide 2 by screwing. Therefore, the guide 2 moves in the front-back direction integrally with the rack 5. Although the rack 5 is fixed to the left end of the guide 2, a guide member such as a rack is preferably disposed at the right end of the guide 2 as well.

At the upper end of the rack 5, a detected piece 5*a* is provided to protrude upward. The detected piece 5*a* is detected by the guide detection sensor 6 when the guide 2 is at the retraction position P0 illustrated in FIG. 2.

The guide detection sensor 6 is, for example, a light shielding sensor having a downward U shape, and detects the detected piece 5*a* when the detection light is shielded by the detected piece 5*a*.

As illustrated in FIGS. 4 to 5B, the gear detection sensor 7 is, for example, a light shielding sensor having an upward U shape, and detects the detected piece 3*a*-4 when the detection light is shielded by the detected piece 3*a*-4 of the intermittent gear 3*a*.

Note that, in the above description, the bill B conveyed in the shorter direction abuts on the guide 2, but the bill B conveyed in the longer direction may abut on the guide 2. In addition, the guide 2 is not limited to one on which the bill B abuts, and may be arranged on one side or both sides in a direction orthogonal to the conveyance direction of the bill B as long as the guide 2 regulates the position of the bill B (paper sheet).

Although the power transmission mechanism 3 includes the intermittent gear 3*a* in the above description, the power transmission mechanism 3 is not limited to one including the intermittent gear 3*a* as long as the guide 2 is moved to three or more positions by power obtained from the separate mechanism (drive gear 19), which is different from the guide mechanism 1.

In the above description, the switching drive unit 4 includes the rotary solenoid 4*a*, but may include another drive source. However, in a case where this drive source moves the drive target to three or more positions, the drive source can move the guide 2 to three or more positions by omitting the power transmission mechanism 3. Therefore, the drive source of the guide mechanism 1 may be a simple source that moves the drive target to only two positions.

Although the power transmission mechanism 3 moves the guide 2 via the rack 5 in the above description, the configuration for moving the guide 2 is not limited to the configuration using the rack 5. In this manner, various configurations in the above description are illustrative only, and can appropriately be changed.

In the present embodiment described above, for example, the guide mechanism 1 arranged in the bill processing machine 100 (an example of a paper sheet handling apparatus) is the guide mechanism 1 including the guide 2 that regulates the position of the bill B (an example of a paper sheet) stacked, and includes the power transmission mechanism 3 that moves the guide 2 to the retraction position P0 and the regulation positions P1 and P2 (an example of three or more positions) by means of power obtained from the drive gear 19 (separate mechanism), which is different from the guide mechanism 1, and the switching drive unit 4 that switches the power transmission mechanism 3 between a transmission state in which the power of the drive gear 19 is transmitted to the guide 2 and a non-transmission state in which the power of the drive gear 19 is not transmitted.

As a result, for example, the guide 2 can be moved to the plurality of regulation positions P1 and P2 and the like according to the size of the bill B stacked on the stage 11, so that a storage space corresponding to the size of the bill B can be formed. In addition, since the power transmission mechanism 3 moves the guide 2 by means of the power obtained from the drive gear 19, the guide 2 can be moved to three or more positions with a simple configuration in which the guide mechanism 1 itself does not have a drive source for moving the guide 2 to three or more positions. Therefore, according to the present embodiment, the storage space corresponding to the size of the bill B can be formed with a simple configuration.

In addition, in the present embodiment, the power transmission mechanism 3 includes the intermittent gear 3*a* having the teeth 3*a*-1 only in some parts in the rotation direction, and the switching drive unit 4 switches the power transmission mechanism 3 to the transmission state by rotating the intermittent gear 3*a* such that the teeth 3*a*-1 mesh with the drive gear 19 (separate mechanism), and switches the power transmission mechanism 3 to the non-transmission state by rotating the intermittent gear 3*a* such that the teeth 3*a*-1 do not mesh with the drive gear 19.

Thus, the power transmission mechanism 3 can be switched between the transmission state and the non-transmission state with a simple configuration using the intermittent gear 3*a*.

In addition, in the present embodiment, the guide 2 regulates the position of the bill B stacked on the stage 11 that is movable up and down, and the three or more positions to which the guide 2 is movable include the two or more regulation positions P1 and P2 that regulate the position of the bill B above the stage 11 and the retraction position P0 that does not interfere with upward and downward movement of the stage 11.

As a result, it is possible to form a storage space corresponding to the size of the bill B by moving the guide 2 to the plurality of regulation positions P1 and P2, and it is also possible to regulate the position of the bill B stacked on the stage 11 that is movable up and down by moving the guide 2 to the retraction position P0 that does not interfere with upward and downward movement of the stage 11.

Note that the present invention is not limited to the above-mentioned embodiment as it is, and can be embodied by modifying the components thereof. For example, various inventions can be formed by appropriately combining the plurality of components disclosed in the present embodiment. In this manner, various modifications and applications of the invention can be made without departing from the spirit of the invention.

What is claimed is:

1. A guide mechanism including a guide that regulates a position of a paper sheet stacked, the guide mechanism comprising:

a power transmitter that moves the guide to three or more positions by means of power obtained from a separate mechanism, which is different from the guide mechanism; and a switching drive that switches the power transmitter between a transmission state in which the power of the separate mechanism is transmitted to the guide and a non-transmission state in which the power of the separate mechanism is not transmitted, wherein the power transmitter includes an intermittent gear having teeth only in a part of a rotation direction, and wherein the switching drive switches the power transmitter to the transmission state by rotating the intermittent gear such that the teeth mesh with the separate mechanism, and switches the power transmitter to the non-transmission state by rotating the intermittent gear such that the teeth do not mesh with the separate mechanism.

2. The guide mechanism according to claim 1, wherein the guide regulates the position of the paper sheet stacked on a stage that is movable up and down, and wherein the three or more positions of the guide include two or more regulation positions that regulate the position of the paper sheet above the stage and a retraction position that does not interfere with upward and downward movement of the stage.

3. A paper sheet handling apparatus comprising a guide mechanism, wherein the guide mechanism includes a guide that regulates a position of a paper sheet stacked, a power transmitter that moves the guide to three or more positions by means of power obtained from a separate mechanism, which is different from the guide mechanism, and a switching drive that switches the power transmitter between a transmission state in which the power of the separate mechanism is transmitted to the guide and a non-transmission state in which the power of the separate mechanism is not transmitted, wherein the power transmitter includes an intermittent gear having teeth only in a part of a rotation direction, and wherein the switching drive switches the power transmitter to the transmission state by rotating the intermittent gear such that the teeth mesh with the separate mechanism, and switches the power transmitter to the non-transmission state by rotating the intermittent gear such that the teeth do not mesh with the separate mechanism.

* * * * *